United States Patent
Wall

(10) Patent No.: US 7,299,822 B2
(45) Date of Patent: Nov. 27, 2007

(54) LIQUID LEVEL REGULATION APPARATUS

(75) Inventor: Peter Wall, Wauchope (AU)

(73) Assignee: Auto Flow Fate Pty Ltd., South Wales (AU)

( * ) Notice: Subject to any disclaimer, the term of this patent is extended or adjusted under 35 U.S.C. 154(b) by 327 days.

(21) Appl. No.: 10/489,134

(22) PCT Filed: Sep. 7, 2001

(86) PCT No.: PCT/AU01/01124

§ 371 (c)(1),
(2), (4) Date: Aug. 30, 2004

(87) PCT Pub. No.: WO03/023148

PCT Pub. Date: Mar. 20, 2003

(65) Prior Publication Data

US 2005/0000573 A1    Jan. 6, 2005

(51) Int. Cl.
*E02B 7/20* (2006.01)
(52) U.S. Cl. .................. 137/578; 137/577; 405/96
(58) Field of Classification Search .......... 137/395, 137/396, 397, 398, 578, 579; 405/52, 80, 405/87, 88, 92, 96
See application file for complete search history.

(56) References Cited

U.S. PATENT DOCUMENTS

| | | | | |
|---|---|---|---|---|
| 947,325 A | * | 1/1910 | Callaway | 137/578 |
| 3,289,417 A | * | 12/1966 | Girden | 405/96 |
| 3,701,260 A | * | 10/1972 | Soileau | 405/88 |
| 3,832,854 A | * | 9/1974 | Metts | 405/88 |
| 4,305,426 A | * | 12/1981 | Scheid et al. | 137/578 |
| 4,700,734 A | * | 10/1987 | McCauley | 137/577 |
| 5,255,999 A | * | 10/1993 | Perslow | 405/87 |
| 5,290,434 A | * | 3/1994 | Richard | 137/578 |

FOREIGN PATENT DOCUMENTS

JP    05280028 A    * 10/1993

* cited by examiner

*Primary Examiner*—John Rivell
(74) *Attorney, Agent, or Firm*—Seyfarth Shaw LLP

(57) ABSTRACT

Apparatus (10) is defined for regulating the level of liquid on a first side of a barrier (12) with respect to a moveable level of liquid on a second side of the barrier. The apparatus includes an inlet conduit (30) for positioning on the second side of the barrier and having an inlet (38) that is arranged for moving up and down with the liquid level, and an outlet conduit (16) for positioning on the first side of the barrier (12) and in liquid communication with the inlet conduit (30) across the barrier. The outlet conduit has an outlet (22) that can be located at a predetermined liquid level at the first side.

17 Claims, 2 Drawing Sheets

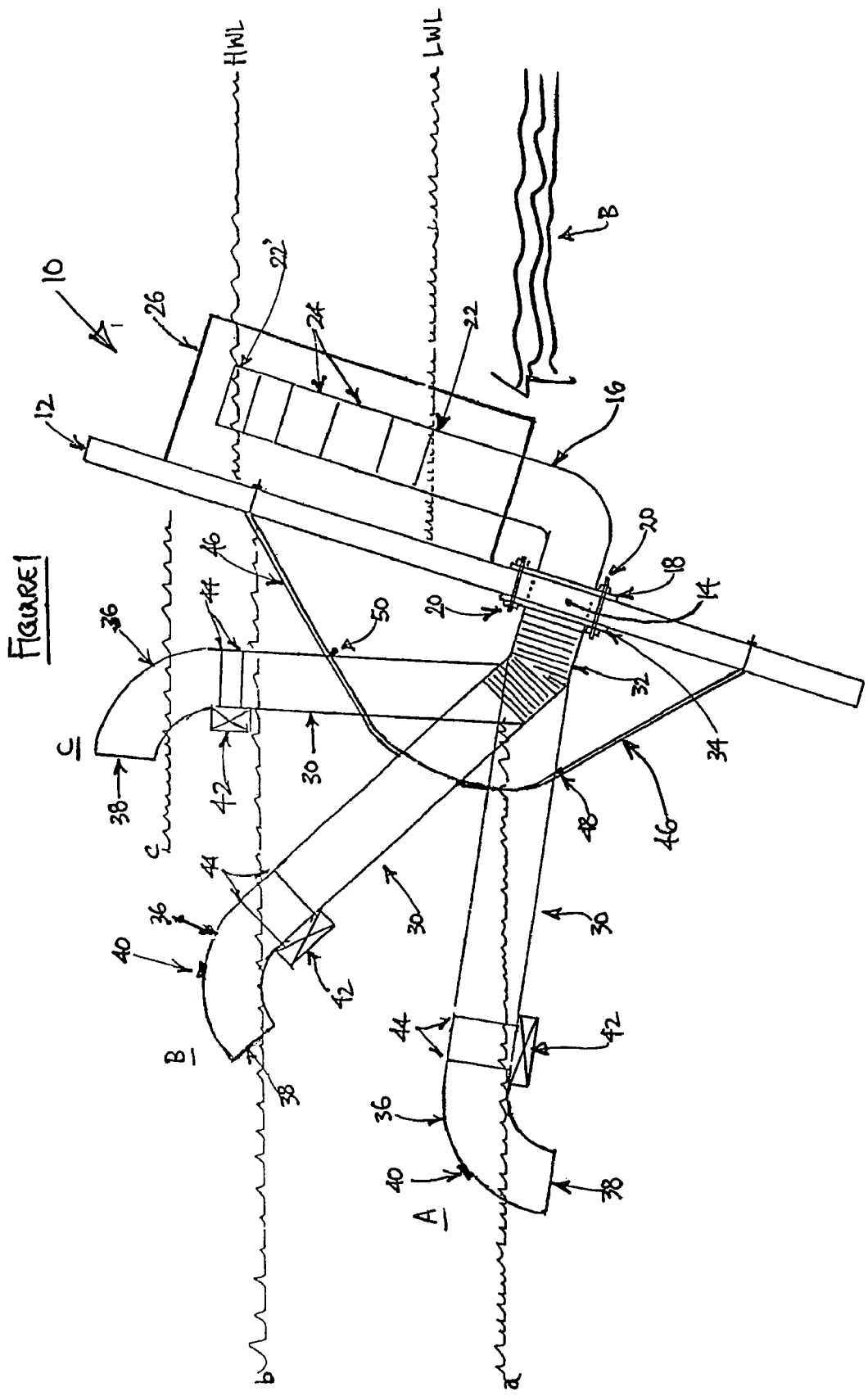

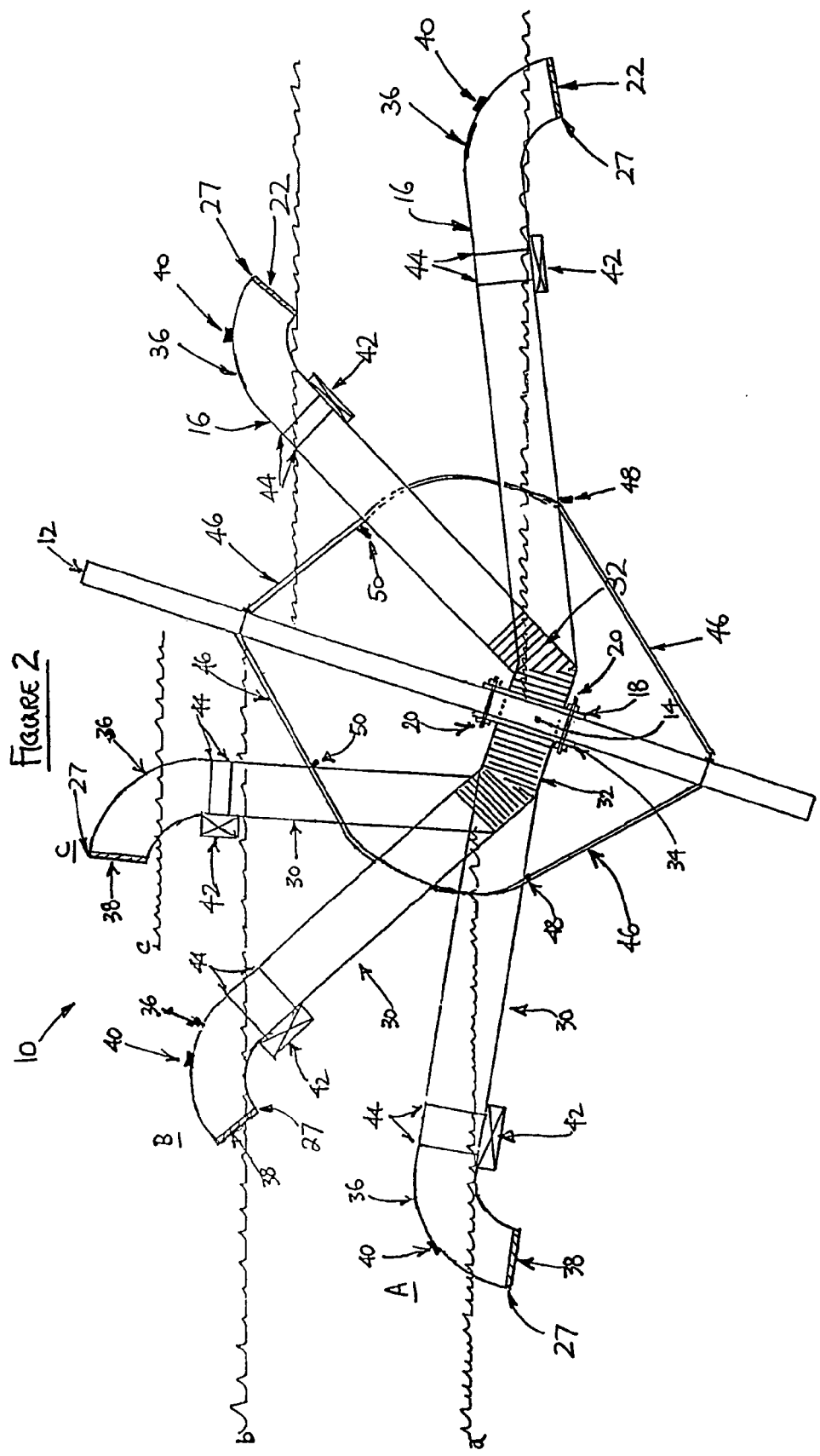

LIQUID LEVEL REGULATION APPARATUS

FIELD OF THE INVENTION

The present invention relates to liquid level regulation apparatus, which finds particular use in agriculture, aquaculture and horticulture but which is not so limited. A particular, though not exclusive, application is to regulate liquid level in a fixed body with respect to a height moveable body of liquid (e.g. a tidal body). The invention will be primarily described with reference to this application, but it should be appreciated that it is not so limited.

BACKGROUND TO THE INVENTION

Floodgates and barriers are employed between two bodies of water to separate and maintain a body of liquid on one side of the floodgate with respect to a moveable level of the water on the other side. Floodgates are particularly employed where the moveable body of water is tidal (e.g. a sea or ocean, or a tidal lake or river). There may be situations where it is desirable to transfer water between the bodies, and the present invention has been conceived in this context.

Apparatus which includes a fluid inlet and outlet conduit on opposing sides of a reservoir barrier is shown in WO92/21823, which teaches a method and apparatus for the removal of sediment particles from the bottom of the reservoir via the fluid conduit. In WO92/21823 the inlet fluid conduit has various openings which are located close to the reservoir floor and the flow of the fluid through the conduit can act to draw the particles upward into the flow stream and out of the reservoir. However, this does not disclose any methodology or apparatus for regulating the liquid level on the fluid outlet side of the barrier. Furthermore this document does not disclose the outcome of water on the outlet side, or reasons why fluid flow regulation is advantageous.

SUMMARY OF THE PRESENT INVENTION

The present invention provides an apparatus for regulating the level of liquid on a first side of a barrier with respect to a moveable level of liquid on a second side of the barrier, including:

an inlet conduit for positioning on the second side and having an inlet that is arranged for moving up and down with the liquid on that side and;

an outlet conduit for positioning on the first side of the barrier and in liquid communication with the inlet conduit across the barrier, the outlet conduit having an outlet that can be located at a predetermined liquid level on the first side.

Such an apparatus enables the liquid level to be set on the first side of the barrier, and yet still enables the transfer of liquid across the barrier via the conduits. In this regard, the terms "inlet" and "outlet" are interchangeable, because whilst in most situations it is desirable for liquid to flow from the liquid of changing level to the fixed level liquid, in some other applications the reverse may be desirable.

Preferably the inlet conduit is flexibly coupled to the barrier at a passage therethrough for enabling an up and down movement of virtually the whole inlet conduit with respect to the barrier. Preferably the flexible coupling is a flexible boot sealed at one end to the inlet conduit and at the other end to the passage. Such sealing prevents the deterioration over time of level differentiation across the barrier.

Typically the passage is defined by removing a core from the barrier, and typically the boot is fixed to the barrier via an annular plate mounted (e.g. bolted or screwed) to the barrier. A similar arrangement can be employed on the first side to fasten the outlet conduit to the barrier.

Preferably the inlet conduit further includes a float adjustably arranged thereon for facilitating the up and down movement of the inlet with the movable liquid level. By employing an adjustable float, the depth and submersion of inlet, responsiveness, and extent of movement of the inlet conduit etc can also be regulated. The float is typically adjustably arranged on the outside of the conduit (e.g. using adjustable hose type clamps, catches, ties or straps etc). In an alternative arrangement, the conduit itself may be floatable (e.g. where the adjustability of a separate float is not required).

Preferably the inlet conduit moves up and down between a pair of guide rods arranged on and extending out from the barrier on the second side. These rods ensure a controlled conduit movement and thus a controlled response to liquid level variation. Typically the guide rods have upper and lower stops arranged thereon to respectively delimit the up and down travel of the inlet conduit (e.g. these stops may correspond to a maximum high tide and low tide level respectively).

Preferably the inlet is defined as a downwardly curved elbow formation positioned at the end of the inlet conduit, and typically the elbow includes a vent defined in an upper part thereof to release any air pressure that may build up therein (e.g. where the inlet itself is submerged in liquid).

Preferably the inlet conduit includes a non-return valve that is arranged to allow liquid to flow from the inlet conduit to the outlet conduit only. This can provide a lock system in some applications of the apparatus so that e.g. the predetermined liquid level on the first side is able to be maintained higher than the liquid level on the second side or e.g. to substantially limit liquid from the first side mixing with liquid on the second side.

Preferably the level of the outlet of the outlet conduit is also adjustable. In a preferred variation and in a similar manner to the inlet conduit, preferably the outlet conduit is flexibly coupled to the barrier at a passage therethrough, for enabling an up and down movement of the outlet conduit with respect to the barrier. Again, typically the flexible coupling is a flexible boot sealed at one end to the outlet conduit, and sealed at the other end to the passage.

The outlet conduit can also include a float adjustably arranged thereon for facilitating the up and down movement of the outlet, in the manner as already described for the inlet conduit. Preferably the outlet conduit can also move between guide rods and stops in the manner as already described for the inlet conduit. This movement can also be fixed or locked where it is desired to set or maintain the liquid level on the first side.

Alternatively the outlet conduit is fixed against movement, but the outlet itself may be height adjustable. In this regard the height may be upwardly adjustable by positioning one or more conduit extension pieces on the end of the outlet, or the outlet conduit may be telescopic etc. Thus, the level of liquid on the first side of the barrier can also be set and maintained (i.e. regulated) at a number of different desired heights.

Whether the outlet conduit is flexibly coupled or fixed, preferably the outlet is surrounded by a mesh filter, or is fitted with a mesh filter cap, to prevent the ingress of debris into the conduit system and thus to prevent debris transfer between liquid bodies on opposite sides of the gate.

Similarly the inlet conduit can be surrounded by a mesh filter, or is fitted with a mesh filter cap in the same manner and for the same reasons as described for the outlet conduit.

Typically the barrier is a floodgate, and typically the apparatus is used in conjunction with a barrier between a tidal (moveable) liquid body and a fixed height liquid body. For example, the tidal liquid body can be a tidal salt water body and the fixed height liquid body can be a fresh water body.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 1 shows a schematic side elevation of a preferred liquid level regulation apparatus in accordance with the present invention; and FIG. 2 shows a further schematic side elevation of a preferred liquid level regulation apparatus in accordance with the present invention.

MODES FOR CARRYING OUT THE INVENTION

Referring to the drawings, apparatus for regulating the level of liquid on a first side of a barrier with respect to a moveable level of liquid on a second side of the barrier is shown in the form of a water height regulator (10). The water height regulator apparatus is located on a barrier in the form of a floodgate (12). To prepare the floodgate for mounting of the apparatus, a core of the floodgate is removed to define a passage (14) therethrough (typically a circular passage).

Mounted on a first side of the floodgate is an outlet conduit in the form of outlet pipe (16). The outlet pipe has a flared or flanged end (18) which is fastened via bolts (20) to the floodgate so that the pipe opening at that end aligns with passage (14). The location of the opposite end of pipe (16) determines the liquid height on the outlet pipe side of the barrier.

In the embodiment of FIG. 1, the level of outlet (22) can be varied by positioning one or more pipe extension pieces (24) thereon (e.g. which may couple to the outlet pipe in a male-female coupling arrangement). As shown, when no extension pieces are provided, a low water level LWL is defined by the outlet, but when a number of extension pieces are added a new outlet (22') is defined, and thus a high water level HWL can be set. The repositioning of outlet (22) can also be achieved by making the outlet pipe (16) telescopic.

In a second embodiment as shown in FIG. 2, the outlet pipe (16) can be moveable (pivotable) and adopt a plurality of positions as shown, the pipe connected to the floodgate (12) at the passage (14) via a flexible corrugated boot (32) as described below.

Some of these features of the second embodiment are described in detail below in relation to the inlet pipe (30) of the first embodiment and are not repeated here for reasons of brevity. In FIG. 2, like reference numerals are also used to denote similar or like parts.

However it is achieved, the adjustability of the outlet pipe is important for liquid level regulation on the first side of the barrier.

Referring again to FIG. 1, a barrier screen (26), mounted to and extending out from the floodgate (12), surrounds the outlet (22) (in both low and extended or pivoted orientations) and prevents the release from and ingress of debris into the conduit. Typically the barrier screen is formed from a galvanised steel mesh, stainless steel mesh etc. In a further preferred embodiment the barrier screen (26) can be replaced or supplemented with a mesh filter cap (27) fitted over the outlet (22) which performs the same function. The features of the barrier screen and the mesh filter cap can also be replicated on or around the inlet pipe (30) in further embodiments and are not repeated here for reasons of brevity. However it is achieved, the positioning of such screens on either or both of the inlet pipe (30) or the outlet (22) can prevent the release from and/or the ingress of debris into either conduit.

Mounted to the floodgate (12) on the opposite (second) side is the moveable (pivotable) inlet pipe (30). The movable inlet pipe can adopt a plurality of positions, and three such positions are shown schematically in FIG. 1 as A, B and C. Position A typically corresponds to a low tide water level, position B to a high tide water level, and position C to a flood tide water level (as depicted schematically by water level lines a, b and c). Inlet pipe (30) is connected to the floodgate (12) at passage (14) via a flexible corrugated boot (32). Typically the boot is formed from a polymeric (e.g. synthetic or natural rubber) material to provide for maximum flexibility and yet long life durability. A flared or flanged end of the boot is typically clamped under an annular mounting plate (34), itself fastened by bolts (20) to the floodgate (12), to provide for a liquid tight seal thereat. The opposite end of the boot is either stretched around and/or glue-fastened to the inlet pipe (30).

The inlet pipe typically has a curved elbow (36) attached or formed at the open inlet end (38). The elbow preferably ensures that at least part of the inlet (38) is submerged in surrounding liquid during the normal operating liquid levels on that side of the floodgate. Desirably all or most of the inlet end is submerged in the liquid at most operating liquid levels to prevent the inflow of debris into the conduit. In addition, to prevent the formation of back pressure from entrapped gas (typically air) when the inlet end is completely submerged, a vent (40) is defined in the elbow (36) to release such gas pressure, thereby maintaining flow conditions through the conduits.

Mounted at or near the curved elbow (36) is a relocatable float (42). The float is fastened to the outside surface of the pipe (30) via connecting bands (44), which may be adjustable clamps (such as hose clamps), clips, strapping, ties or any other suitable adjustable attachment mechanism. Thus, the float can be located at various positions along the inlet pipe, to change fluid flow into the inlet and thus the levels on both sides of the barrier. The float can also help to vary movement characteristics of the pipe (30). For example, when the float is located at or near the elbow section of the pipe, the inlet (38) of pipe (30) can be raised partially or entirely above surrounding liquid levels, thus restricting liquid flow into the conduit. However, as the float is incrementally moved along the inlet conduit less or more inlet can be submerged, thus varying the flow and hence water levels on both sides. The float position, buoyancy characteristics and size can also be changed for different applications (e.g. different liquid qualities and densities, different conduit movement response time requirements etc).

A similar arrangement can also be made in relation to the outlet pipe in the second embodiment of FIG. 2 where the outlet pipe is moveable (pivotable). The relocatable float can be fastened to various positions on the outside surface of the outlet pipe to regulate fluid flow therethrough and also to restrict liquid backflow into the conduit from the first side, for example if a sudden surge or flash flood occurs.

To prevent lateral movement of the inlet pipe during rising and falling (e.g. with the rising and falling of surrounding liquid levels) a pair of parallel guide rods (46) are mounted to the floodgate and project out on opposite sides of pipe (30) as shown. Thus, the rods restrict movement of the pipe to the vertical plane (preventing lateral movement thereof). Mounted to extend between the guide rods are upper and lower transverse arrestor bars (48) and (50) which delimit the upper vertical travel (location C) and the lower vertical travel (location A) of the pipe (30). Typically the location of these bars is pre-calibrated and corresponds to known maximum and minimum liquid levels (e.g. tidal or flood levels) on the inlet side of the floodgate. A similar arrangement can also be employed in relation to the outlet pipe in those embodiments where the outlet pipe is moveable (pivotable).

Furthermore, as shown in position C, the maximum water level C may be a freak or irregular level and, in this case, it may be desirable not to transfer any liquid from one side of the floodgate to the other. Hence the inlet end (38) is positioned to be above this water level.

The inlet conduit can include a non-return valve (52) that is arranged to allow liquid to flow from the inlet conduit to the outlet conduit only. This can provide a lock system in some applications of the apparatus for example so that the predetermined liquid level on the outlet side is able to be maintained higher than the liquid level on the inlet side. For example, in coastal regions where very changeable tides occur, it is beneficial to have water height regulation apparatus so that water can be retained in a lock on the outlet side in which hulled boats are moored, while the sea or river water level drops on the inlet side. In this way hulled boats can remain floating on water irrespective of regional tidal variations which might otherwise 'ground' the boat hull. The non-return valve can also be used to substantially limit liquid from the outlet side mixing with liquid on the inlet side, particularly in situations where it is advantageous to separate water bodies e.g. acid mine drainage waters or other industrial waters from river water or groundwater or, for example, to separate fresh water from sea water.

A typical application of the apparatus of the invention is in agricultural irrigation. In this case, the inlet pipe side may correspond to a tidal water body, and the outlet pipe side may correspond to an irrigation flow way, lake etc. Water typically travels from the tidal side to the fixed level side. When the inlet is lower than the outlet, the flow from down stream to up stream can occur (for example because the body of liquid on the inlet side is of greater mass or force than the body of liquid on the outlet side). However, this situation can be reversed if required. Water flows and heights can also be regulated by moving the relocatable float, and by the addition and subtraction of extension pieces, use of a moveable outlet pipe etc as described above.

In various applications, the apparatus functions automatically once it has been installed and calibrated, and no further attention is required unless parameters are changed (which may then require recalibration). Further, the floodgate can separate water bodies from each other where the body on the outlet side is contaminated (e.g. via contaminated earth in the bed B of the body). A common source of contaminated waters occurs in the mining industry where exposed rocks and soil can acidify etc the water (e.g. with acid sulfate waters resulting). In any case, the preferred apparatus enables the contaminated waters to be replenished.

The apparatus may also be used in other applications such as in the exchange of water (and even the exchange of fish and food) in fish ladders (aquaculture) and in breeding ponds. In fact, the apparatus can function automatically in any mode were there is a liquid level that changes (e.g. tidal or simulated tidal changes) on one side (or even both sides) of a floodgate, barrier or partition.

Typically low pressure plastic piping or tubing is used for the inlet and outlet pipes, typically a UV resistant plastic. Pipes can be used that are capable of reflecting light internally to e.g. encourage fish to swim up the pipe, as fish are reticent about swimming into dark passages containing water. The pipe may also be transparent to light, or partially transparent via the use of perspex segments or inserts, again to encourage fish to swim therethrough. The diameter of the piping or tubing is varied depending on the amount of water to be transferred, and the wall thicknesses are set in accordance with typical low pressure standards.

Typically the flexible boot has a diameter that corresponds with the piping and is sufficiently flexible to move (traverse) at least 10-90°. Typically the boot forms the female part in its attachment to the inlet pipe.

The apparatus can be retrofitted to existing floodgates and barriers by removing a core equal to the diameter of the piping, by drilling bolt holes and then by fitting the flexible boot or boots and inlet and outlet pipes as described above, optionally employing pressure plates where water pressure is a factor. However, the apparatus and floodgate can also be provided new as a unit.

Typically the guide rods are formed from galvanised steel or stainless steel, as is the mesh. When water flows from the inlet pipe to the outlet pipe, the galvanised mesh functions as a filter, and thus may require periodical cleaning or emptying.

For larger volume water transfers, larger diameter tubes can be employed (ie the apparatus can be scaled up or down as required) and also multiple apparatus units can be installed across a floodgate.

It is to be understood that, if any prior art information is referred to herein, such reference does not constitute an admission that the information forms a part of the common general knowledge in the art, in Australia or any other country.

Whilst the invention has be described with reference to a number of preferred embodiments, it should be appreciated that the invention can be embodied in many other forms.

The invention claimed is:

1. The apparatus for regulating the level of liquid on a first side of a barrier with respect to a moveable level of liquid on a second side of the barrier, including:
   an inlet conduit for positioning on the second side and having an inlet that is arranged for moving up and down with the liquid on that side and;
   an outlet conduit for positioning on the first side of the barrier and in liquid communication with the inlet conduit across the barrier, the outlet conduit being flexibly coupled to the barrier at a passage therethrough for enabling an up and down movement of the outlet conduit with respect to the barrier such the outlet can be located at a predetermined liquid level on the first side.

2. The apparatus as claimed in claim 1 wherein the level of the outlet of the outlet conduit is adjustable.

3. The apparatus as claimed in claim 1 wherein the inlet conduit is flexibly coupled to the barrier at a passage therethrough, for enabling an up and down movement of the inlet conduit with respect to the barrier.

4. The apparatus claimed in claim 3 wherein the flexible coupling is a flexible boot sealed at one end to the inlet conduit, and sealed at the other end to the passage.

5. The apparatus as claimed in claim 1 wherein the inlet conduit further includes a float adjustably arranged thereon for facilitating the up and down movement of the inlet with the moveable liquid level.

6. The apparatus as claimed in claim 1 wherein the inlet conduit moves up and down between a pair of guide rods arranged on and extending out from the barrier on the second side.

7. The apparatus as claimed in claim 6 wherein the guide rods have upper and lower stops arranged thereon to respectively delimit the up and down travel of the inlet conduit.

8. The apparatus as claimed in claim 1 wherein the inlet is defined as a downwardly curved elbow formation positioned at the end of the inlet conduit.

9. The apparatus as claimed in claim 8 wherein the elbow includes a vent defined in an upper part thereof to release any air pressure that may build up therein.

10. The apparatus as claimed in claim 1 wherein the outlet conduit is height adjustable by positioning one or more conduit extension pieces on the end of the outlet.

11. The apparatus claimed in claim 1 wherein the outtlet conduit has a flexible coupling for facilitating the up and down movement of the outlet and a float adjustably arranged on the outlet conduit.

12. The apparatus as claimed in claim 1 wherein the outlet is surrounded by a mesh filter, or is fitted with a mesh filter cap, to prevent the ingress of debris into the conduit system and thus to prevent debris transfer between liquid bodies on opposite sides of the gate.

13. The apparatus as claimed in claim 1 wherein the inlet is surrounded by a mesh filter, or is fitted with a mesh filter cap, to prevent the ingress of debris into the conduit system and thus to prevent debris transfer between liquid bodies on opposite sides of the gate.

14. The apparatus as claimed in claim 1 wherein the barrier is a floodgate.

15. The apparatus as claimed in claim 1 wherein the apparatus is used in conjunction with a barrier between a tidal (moveable) liquid body and a fixed height liquid body.

16. The apparatus as claimed in claim 1 wherein the outlet conduit moves up and down between a pair of guide rods arranged on and extending out from the barrier.

17. The apparatus as claimed in claim 16 wherein the guide rods have upper and lower stops arranged thereon to respectively delimit the up and down travel of the conduit.

* * * * *

UNITED STATES PATENT AND TRADEMARK OFFICE
CERTIFICATE OF CORRECTION

PATENT NO. : 7,299,822 B2  Page 1 of 1
APPLICATION NO. : 10/489134
DATED : November 27, 2007
INVENTOR(S) : Peter Wall It is certified that error appears in the above-identified patent and that said Letters Patent is hereby corrected as shown below:

Title Page, Item [73] Assignee

Auto Flow Fate Pty Ltd. should be corrected as Auto Flow Gate Pty Ltd.

Signed and Sealed this

Twenty-second Day of December, 2009

David J. Kappos
*Director of the United States Patent and Trademark Office*